(12) United States Patent
Mercier et al.

(10) Patent No.: US 10,584,606 B2
(45) Date of Patent: Mar. 10, 2020

(54) TURBOMACHINE CASE COMPRISING AN ACOUSTIC STRUCTURE AND AN ABRADABLE ELEMENT

(71) Applicant: SAFRAN AIRCRAFT ENGINES, Paris (FR)

(72) Inventors: Remi Roland Robert Mercier, Charenton le Pont (FR); Kaelig Merwen Orieux, Fontaine le Port (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 109 days.

(21) Appl. No.: 15/825,855

(22) Filed: Nov. 29, 2017

(65) Prior Publication Data

US 2018/0149033 A1  May 31, 2018

(30) Foreign Application Priority Data

Nov. 30, 2016 (FR) ...................... 16 61682

(51) Int. Cl.
*F01D 11/12* (2006.01)
*F02C 7/045* (2006.01)

(52) U.S. Cl.
CPC ............ *F01D 11/122* (2013.01); *F02C 7/045* (2013.01); *F05D 2230/60* (2013.01); *F05D 2260/96* (2013.01); *Y02T 50/672* (2013.01)

(58) Field of Classification Search
CPC ........ F01D 11/08; F01D 11/12; F01D 11/122; F01D 11/127; F01D 25/24; F02C 7/045; F05D 2230/60; F05D 2260/96; Y02T 50/672
See application file for complete search history.

(56) References Cited

U.S. PATENT DOCUMENTS

| | | | | |
|---|---|---|---|---|
| 6,123,170 A | * | 9/2000 | Porte | B64D 33/02 |
| | | | | 181/198 |
| 6,382,905 B1 | * | 5/2002 | Czachor | F01D 11/122 |
| | | | | 415/128 |
| 8,544,598 B2 | * | 10/2013 | Gaudry | B64D 33/02 |
| | | | | 181/213 |
| 2013/0048414 A1 | | 2/2013 | Gaudry et al. | |
| 2014/0321999 A1 | * | 10/2014 | Guilbert | F02C 7/045 |
| | | | | 415/182.1 |

(Continued)

FOREIGN PATENT DOCUMENTS

| EP | 2 952 696 | 12/2015 |
|---|---|---|
| WO | WO 2014/068261 A1 | 5/2014 |
| WO | WO 2014/140483 A1 | 9/2014 |

OTHER PUBLICATIONS

French Preliminary Search Report dated Jul. 27, 2017 in French Application 16 61682, filed on Nov. 30, 2016 (with English Translation of Categories of cited documents).

*Primary Examiner* — Igor Kershteyn
(74) *Attorney, Agent, or Firm* — Oblon, McClelland, Maier & Neustadt, L.L.P.

(57) ABSTRACT

A case of a turbomachine including an inner wall of revolution coaxial with a principal longitudinal axis of the turbomachine, an acoustic insulation structure installed inside the inner wall of revolution that has an annular principal shape centred on the longitudinal axis, and an abradable annular element, wherein the abradable element is fixed on an inner annular face of the acoustic insulation structure.

10 Claims, 1 Drawing Sheet

(56) References Cited

U.S. PATENT DOCUMENTS

2015/0267555 A1* 9/2015 Plante .................... B64D 29/06
　　　　　　　　　　　　　　　　　　　　　415/119
2016/0032834 A1* 2/2016 Plante ...................... F02K 3/06
　　　　　　　　　　　　　　　　　　　　　415/119

* cited by examiner

TURBOMACHINE CASE COMPRISING AN ACOUSTIC STRUCTURE AND AN ABRADABLE ELEMENT

TECHNICAL DOMAIN

This invention relates to a turbomachine case, particularly an aircraft turbomachine, that comprises an acoustic wall type soundproofing structure and an abradable element.

STATE OF PRIOR ART

A fan case typically comprises an approximately cylindrical wall that extends around the turbomachine fan blades and the inner surface of which is covered by acoustic insulation panels. These panels usually comprise an annular honeycomb structure, the inner and outer faces of which are both covered with a skin that can be multi-perforated to improve the acoustic treatment. They are designed to absorb sound waves generated by the turbomachine fan.

The case thus comprises an acoustic insulation panel located on the upstream side of the fan blades and a panel at the level of the fan blades.

It is also known that an element made of an abradable material can be placed on the panel at the level of the fan blades.

This element made of an abradable material is designed to compensate for dimensional variations of the blades and the case as a function of the different turbomachine operation conditions. This element made of an abradable material is designed to wear preferentially when the blades approach it too closely.

This keeps a minimum radial operating clearance between the tips of the blades and the case, thus limiting losses of efficiency.

Document FR-2.997.726 describes such a fan case comprising a first acoustic insulation panel installed upstream from the fan blades and a second panel supporting the abradable element located at the level of the fan blades.

These panels are usually assembled by bolting the radially outer wall of each panel on the inner wall of the case.

These panel attachment means are difficult to access because they are located between the facing annular faces of the inner wall and the panel.

The attachment means must also be capable of correcting the relative radial positions of the first upstream panel and the second panel on which the abradable element is fixed.

Furthermore, there is a functional clearance between the two panels, particularly due to installation constraints of each panel on the case.

The presence of this clearance creates aerodynamic disturbances and limits the efficiency of the acoustic treatment of the case. There is usually an annular seal in this space, but it causes aerodynamic disturbances upstream from the fan blades.

Consequently, such an assembly of the two panels on the case is complex in practice and requires a long time to be applied correctly.

The purpose of the invention is to disclose a turbomachine case comprising an acoustic insulation structure and an abradable element, with simplified assembly onto the inner wall of the case without creating any aerodynamic disturbances.

PRESENTATION OF THE INVENTION

The invention relates to a turbomachine case comprising an inner wall of revolution coaxial with a principal longitudinal axis of the turbomachine, an acoustic insulation structure installed inside the inner wall of revolution that has an annular principal shape centred on said longitudinal axis, and an abradable annular element, characterised in that the abradable element is fixed on an inner annular face of the annular insulation structure.

Preferably, the acoustic insulation structure comprises an upstream segment and a downstream segment, and in which the abradable element is fixed to said downstream segment.

Preferably, the acoustic insulation structure comprises a radially outer annular wall that is facing the inner wall of the case, a radially inner annular wall comprising an upstream segment, a downstream segment on which the abradable element is fixed and a honeycomb annular structure extending between said two annular walls and an intermediate segment connecting the upstream segment and the downstream segment.

Preferably, the radius of the upstream segment of the inner annular wall is less than the radius of the downstream segment of the inner annular wall.

Preferably, the abradable element comprises a radially inner face that is flush with a radially inner face of the upstream segment of the inner annular wall of the acoustic insulation structure.

Preferably, the abradable element is fixed to the acoustic insulation structure by gluing.

Preferably, the acoustic insulation structure is fixed to the inner wall of the case by gluing.

Preferably, the acoustic insulation structure consists of an element of revolution.

Preferably, the abradable element is an element of revolution.

The invention also relates to a turbomachine fan module comprising mobile blades rotating around a principal axis A of the turbomachine, a nacelle that surrounds the blades and that comprises a case according to the invention.

BRIEF DESCRIPTION OF THE DRAWINGS

Other characteristics and advantages of the invention will become clear after reading the detailed description given below which will be understood more easily with reference to the appended figures.

DETAILED PRESENTATION OF PARTICULAR EMBODIMENTS

Figure 1:
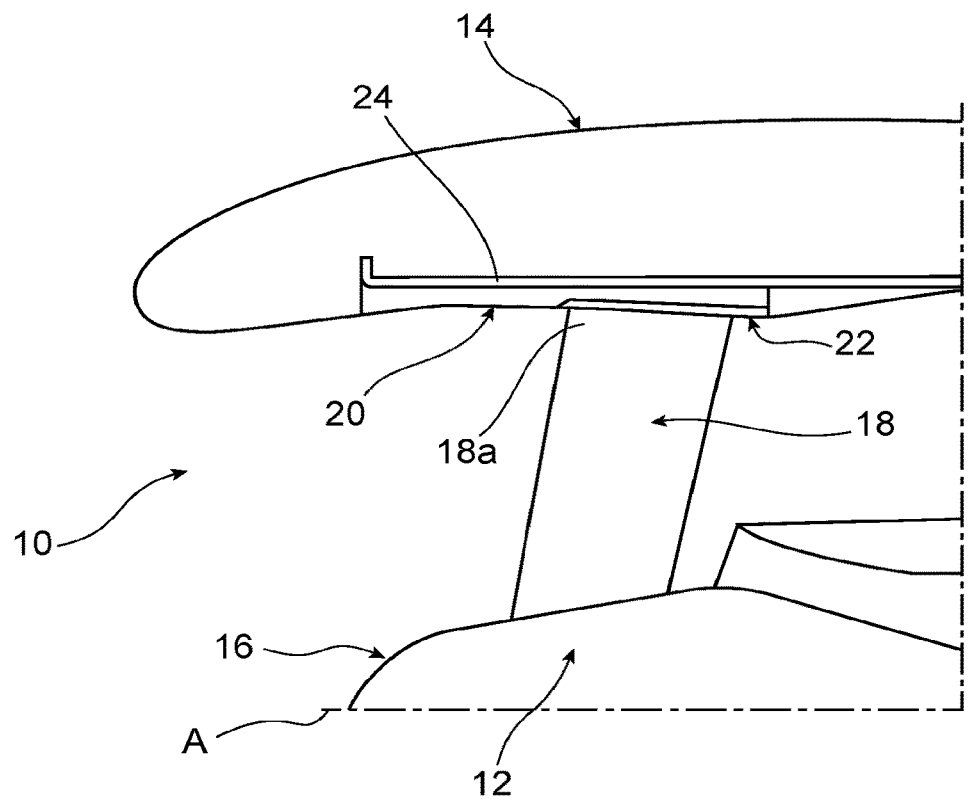
FIG. 1 is a diagrammatic axial sectional view of the upstream end of a turbomachine comprising a case fitted with an acoustic structure and an abradable element according to the invention.

FIG. 1 shows an upstream portion of a turbomachine 10, particularly an aircraft turbomachine.

This upstream portion of the turbomachine 10 comprises a fan 12 that generates an air flow through the turbomachine and a nacelle 14 that surrounds the turbomachine inside which said fan 12 rotates.

In particular, the fan 12 comprises a central hub 16 that rotates about the longitudinal principal axis A of the turbomachine 10 and a plurality of mobile blades 18 that are supported by the hub 16 and are distributed about the main axis of the hub 16.

The inner annular wall of the nacelle 14 is covered by an acoustic insulation structure 20 that is arranged axially upstream from the blades 18 and by an abradable element 22 located axially at the level of the tips 18a of the blades 18.

The nacelle 14 also comprises a case 24 on which the acoustic insulation structure 20 and the abradable element 22 are installed.

Figure 2:
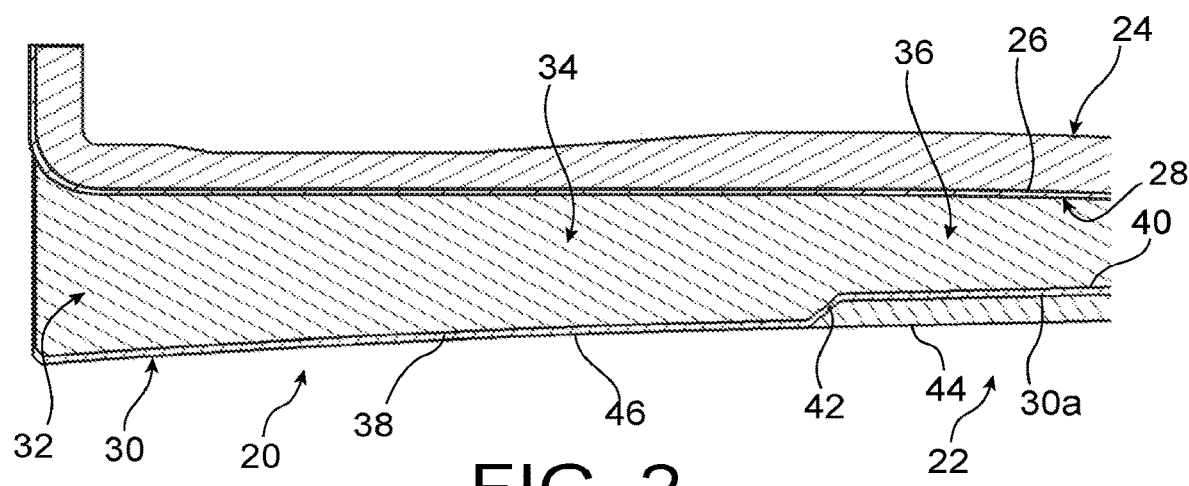
FIG. 2 is a larger scale detail of part of the fan shown in FIG. 1, showing the case supporting the acoustic structure and the abradable element according to the invention.

As can be seen in more detail in FIG. 2, the case 24 comprises an approximately cylindrical inner annular wall 26 that is coaxial with a principal axis of the case 24, that is the principal axis A of the fan 12.

The acoustic insulation structure 20 consists of a composite element composed of a radially outer wall 28 that is located facing the inner annular wall 26 of the case 24, a radially inner wall 30 and a honeycomb structure 32 extending radially between the radially outer wall 28 and the radially inner wall 30.

The honeycomb structure 32 is composed of a plurality of cells (not shown) that open up radially into the radially inner wall 30 and that form acoustic resonators to attenuate noise.

The radially inner wall 30 is commonly called "composite ply" and consists of at least one ply, for example base on carbon. The wall 30 is perforated so that air in the flow stream can communicate with the cells in the honeycomb structure 32. This wall also contributes to the mechanical strength of the honeycomb 32. The abradable element 22 forms an annular element coaxial with the main axis of the fan 12 that is connected to the inner annular wall 26 of the case 24 through a composite structure.

In this case, the composite structure on which the abradable element 22 is fixed consists of a segment of the acoustic insulation structure 20. More particularly, the abradable element 22 is fixed to the inner annular face 30a of the radially inner wall 30 of the acoustic insulation structure 20.

According to one preferred embodiment, the abradable element 22 is fixed directly to the inner annular face 30a of the radially inner wall 30 of the acoustic insulation structure 20.

To achieve this, the acoustic insulation structure 20 comprises a first upstream segment 34 that is located axially upstream from the blades 18 and a downstream segment 36 that is located axially at the level of the tips 18a of the blades 18. The abradable element 22 is fixed on the inner annular face of this downstream segment 36.

Thus, the honeycomb structure 32 is prolonged downstream in the axial direction at least as far as the abradable element 22, that helps to improve the acoustic insulation.

The abradable element 22 must be positioned flush with the radially inner face of the upstream segment 34 of the acoustic insulation structure 20, so as to not hinder the air flow stream.

To achieve this, the radially inner wall 30 of the acoustic insulation structure 20 is composed of an upstream segment 38 partly forming the upstream segment 34 of the acoustic insulation structure 20 and a downstream segment 40 partly forming the downstream segment 36 of the acoustic insulation structure 20.

According to the invention, the abradable element 22 is fixed to the downstream segment 40.

Furthermore, the radius of the upstream segment 38 is less than the radius of the downstream segment 40 of the radially inner wall 30 of the acoustic insulation structure 20. The radially inner wall 30 of the acoustic insulation structure 20 comprises an intermediate segment 42 with a conical main shape connecting the upstream segment 38 to the downstream segment 40.

The difference between the two radii is the initial thickness of the abradable element 22.

Thus, the radially inner face 44 of the abradable element 22 is flush with the radially inner face 46 of the upstream segment 38 of the radially inner wall 30.

The attachment of the abradable element 22 onto the acoustic insulation structure 20 is made by gluing.

Similarly, the attachment of the acoustic insulation structure 20 onto the inner annular wall 26 of the case 24 is also made by gluing.

Such an attachment mode is sufficiently long-lasting so that it does not deteriorate during the various successive uses of the turbomachine 10. Furthermore, this attachment method does not take much space, so that the volume of the honeycomb structure 32 can be optimised, improving the efficiency of the acoustic insulation in the turbomachine 10.

According to one preferred embodiment, the acoustic insulation structure 20 and the abradable element 22 are both coaxial elements of revolution.

According to one variant embodiment, the acoustic insulation structure 20 and the case 24 are made simultaneously, such that the inner annular wall 26 of the case forms the radially outer wall 28 of the acoustic insulation structure 20.

Thus, a single element of revolution is produced, which can save time for fabrication of the turbomachine 10.

It will be understood that the invention is not limited to this embodiment and that according to another variant embodiment, the acoustic insulation structure 20 and the abradable element 22 are composed of a plurality of ring sectors circumferentially in contact with each other.

Furthermore, it will be understood that solidarisation of the abradable element 22 with the acoustic insulation structure 20 is not limited to gluing and that any other equivalent solidarisation method, for example such as a layer made of a polymer material heated in a mould, can form part of the invention.

The invention also relates to a blower module of the turbomachine 10 that comprises the central hub 16, the blades 18 and the nacelle 14.

In this fan module, the nacelle 14 comprises a case 24 that supports an acoustic insulation structure 20 and an abradable element 22 fixed to the case 24 as described above.

The invention claimed is:

1. A case of a turbomachine comprising:
   an inner wall of revolution coaxial with a principal longitudinal axis of the turbomachine;
   an acoustic insulation structure installed inside the inner wall of revolution that has an annular principal shape centered on said longitudinal axis; and
   an abradable annular element,
   wherein the abradable element is fixed on an inner annular face of the acoustic insulation structure by gluing,
   wherein the acoustic insulation structure includes
      a radially outer annular wall that is facing the inner wall of the case,
      a radially inner annular wall comprising
         an upstream segment,
         a downstream segment on which the abradable element is fixed, and
         an intermediate segment connecting the upstream segment and the downstream segment, the intermediate segment presenting a conical shape, and
      a honeycomb annular structure sandwiched between the radially outer annular wall and the radially inner annular wall.

2. The case according to claim 1, wherein a radius of the upstream segment of the radially inner annular wall is less than a radius of the downstream segment of the radially inner annular wall.

3. The case according to claim 1, wherein the abradable element comprises a radially inner face that is flush with a radially inner face of the upstream segment of the radially inner annular wall of the acoustic insulation structure.

4. The case according to claim 1, wherein the acoustic insulation structure is fixed to the inner wall of the case by gluing.

5. The case according to claim 1, wherein the acoustic insulation structure is a single element of revolution.

6. The case according to claim 1, wherein the abradable element is an element of revolution.

7. A fan module of a turbomachine comprising:
    mobile blades rotating around a principal axis A of the turbomachine; and
    a nacelle that surrounds the blades and that comprises a case according to claim 1.

8. The case according to claim 1, wherein the radially inner wall is perforated and includes at least one ply.

9. The case according to claim 1, wherein an upstream end of the inner wall includes a radial flange, an upstream end of the radially outer annular wall includes a radially extending portion abutting the radial flange, and an upstream end of the radially inner annular wall is aligned with the upstream end of the radially outer annular wall in a direction parallel to the longitudinal axis.

10. The fan module according to claim 7, wherein tips of the blades face the abradable element fixed to the downstream segment of the radially inner annular wall.

* * * * *